May 17, 1955
A. B. GUISE ET AL
2,708,605
METHOD FOR CONVEYING FIRE-EXTINGUISHING DRY CHEMICAL
Filed March 28, 1951
2 Sheets-Sheet 1
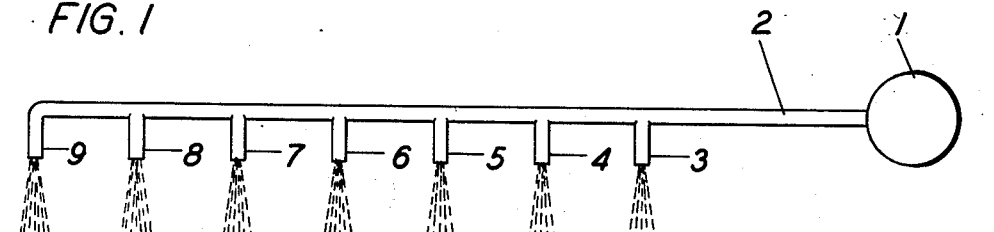
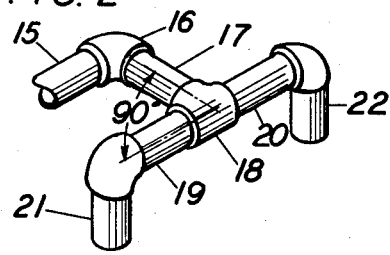
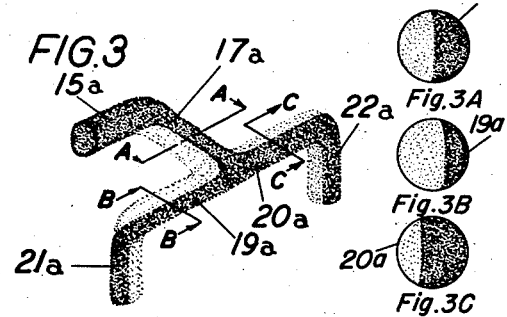
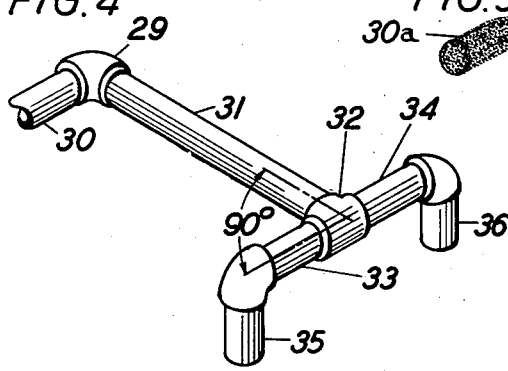
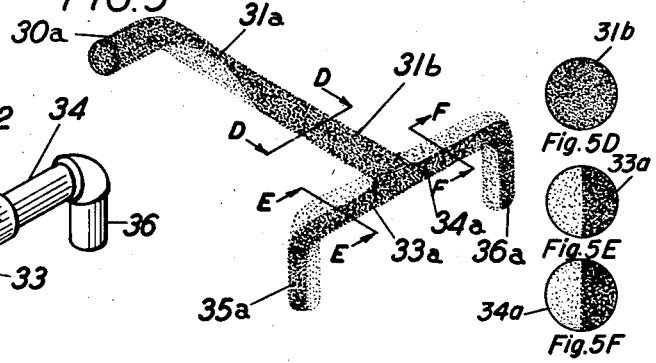
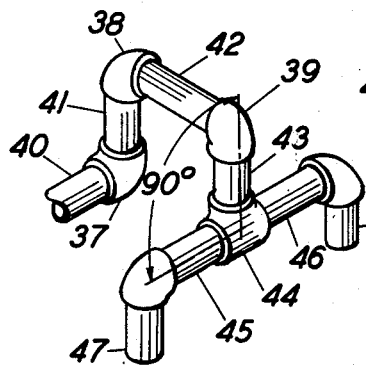
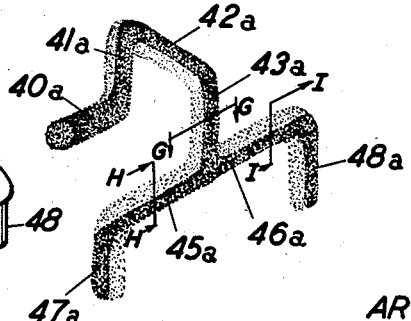
INVENTORS
ARTHUR B. GUISE &
BY WILLIAM P. PAULSEN
Joseph Rossman
ATTORNEY

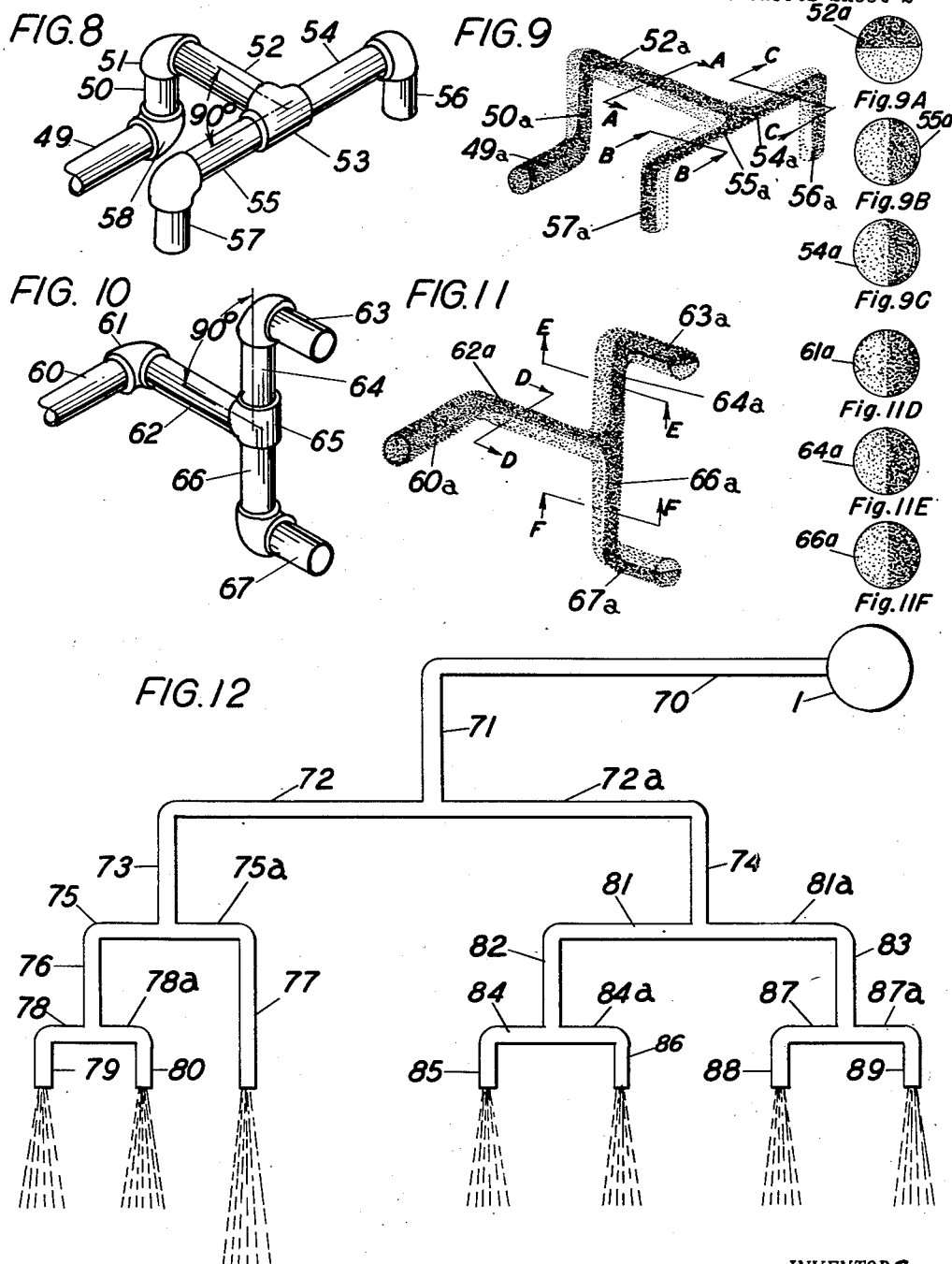

United States Patent Office 2,708,605
Patented May 17, 1955

2,708,605

METHOD FOR CONVEYING FIRE-EXTINGUISHING DRY CHEMICAL

Arthur B. Guise, Marinette, Wis., and William P. Paulsen, Menominee, Mich., assignors to Ansul Chemical Company, Marinette, Wis., a corporation of Wisconsin Application March 28, 1951, Serial No. 217,964

9 Claims. (Cl. 302—66)

This invention relates to a method for conveying fluidized solid particles. More specifically this invention relates to conveying fluidized dry chemical powder through pipe systems for fire-extinguishing purposes.

Attempts have been made in the past to design and install systems whereby fluidized dry chemical powder could be successfully conveyed to nozzles for distributing dry chemical powder over fires for extinguishment purposes. Several such systems have been actually installed in the past, but in most cases it was necessary to build an experimental system of piping simulating the system to be installed and then experimenting with nozzles and otherwise adjusting the piping until proper distribution of the dry chemical powder was obtained. This was found to be impractical and extremely difficult to carry out so that as a result the design of piped systems for distributing dry chemical for fire-extinguishing has been hitherto time consuming, laborious, and almost commercially impractical.

In a dry chemical piped system for fire-extinguishing purposes it is essential to have both a source of fluidized dry chemical and a means for distributing the dry chemical, in proper ratio of fluidizing and expellant gas, to nozzles so located in the area to be protected that the dry chemical is distributed uniformly over the area. The ordinary methods of piping presently used in fire-extinguishing systems utilizing other extinguishing media tend to cause uneven distribution of dry chemical by disturbing the ratio of dry chemical and expellant gas. This resulted in some nozzles being supplied with dry chemical in small quantity and other nozzles with a large quantity. In other cases, where nozzles were taken off the run of T's in straight pipe lines, the greater inertia of the dry chemical particles caused a greater quantity of the dry chemical to be discharged from the nozzles at the end of the line while the nozzles nearer the source of supply discharged a greater quantity of gas.

The present invention overcomes the aforementioned difficulties by providing a pipe system for fire-extinguishing dry chemical which is adapted to convey a stream of fluidized dry chemical having substantially the same ratio of dry chemical to fluidizing and expellant gas in all parts of the system and expelling the stream at any selected point so that it has substantially the same ratio of dry chemical and gas. The essential principle of the present invention resides in equally subdividing the dry chemical and expellant gas in a stream of fluidized fire-extinguishing dry chemical at such point in the system and in such manner that after subdivision the stream still retains substantially the same ratio of dry chemical and gas as in the initial stream. In practice this can be accomplished in any suitable manner and in accordance with a number of illustrative means as will be hereinafter described.

Further advantages and details of the invention will be apparent from the following specification and appended drawings, wherein Figure 1 is a diagrammatic illustration of an inadequate pipe system provided with nozzles for ejecting fire-extinguishing dry chemical streams therefrom, Figure 2 is a perspective view of an unsatisfactory T-connection for supplying dry chemical nozzles, Figure 3 is a perspective view showing diagrammatically the characteristics of a stream of dry chemical flowing through the piping shown in Figure 2, Figure 3A is a cross-sectional view taken on lines A—A of Figure 3, Figure 3B is a cross-sectional view taken on line B—B of Figure 3, Figure 3C is a cross-sectional view taken on line C—C of Figure 3, Figure 4 is a perspective view of a piping arrangement for conveying dry chemical to nozzles in accordance with this invention, Figure 5 is a perspective view showing diagrammatically the characteristics of a stream of dry chemical flowing through the piping shown in Figure 4, Figure 5D is a cross-sectional view taken on line D—D of Figure 5, Figure 5E is a cross-sectional view taken on line E—E of Figure 5, Figure 5F is a cross-sectional view taken on line F—F of Figure 5, Figure 6 is a perspective view of modified piping for conveying dry chemical to nozzles in accordance with this invention, Figure 7 is a perspective view showing diagrammatically the characteristics of a stream of dry chemical flowing through the piping shown in Figure 6, Figure 7G is a cross-sectional view taken on line G—G of Figure 7, Figure 7H is a cross-sectional view taken on line H—H of Figure 7, Figure 7I is a cross-sectional view taken on line I—I of Figure 7, Figure 8 is a perspective view of another piping arrangement for conveying dry chemical to nozzles in accordance with this invention, Figure 9 is a perspective view showing diagrammatically the characteristics of a stream of dry chemical flowing through the piping shown in Figure 8, Figure 9A is a cross-sectional view taken on line A—A of Figure 9, Figure 9B is a cross-sectional view taken on line B—B of Figure 9, Figure 9C is a cross-sectional view taken on line C—C of Figure 9, Figure 10 is a perspective view of another modified piping arrangement for supplying dry chemical in accordance with this invention, Figure 11 is a perspective view showing diagrammatically the characteristics of a stream of dry chemical flowing through the piping shown in Figure 10, Figure 11D is a cross-sectional view taken on line D—D of Figure 11, Figure 11E is a cross-sectional view taken on line E—E of Figure 11, Figure 11F is a cross-sectional view taken on line F—F of Figure 11, and Figure 12 is a diagrammatic view of a piping system for conveying dry chemical to nozzzles in accordance with this invention.

The use of powdered finely divided fire-extinguishing compositions containing sodium bicarbonate as an essential ingredient, such as disclosed in Patent 1,793,420, February 17, 1931, has been found to be very effective in extinguishing fires. Such powdered dry chemical can be effectively used by fluidizing the dry chemical with a non-flammable gas under pressure, such as nitrogen, carbon dioxide, or compressed air and propelling the fluidized dry chemical under gas pressure through suitable conduits and nozzles to the site of the fire. When the fluidized dry chemical is conveyed by expellant gas through a straight pipe 2, as shown in Figure 1, connected to a source 1 of fluidized dry chemical and provided with a plurality of nozzles, indicated by numerals 3 to 9, positioned at intervals in the pipe by suitable T-connections it will be found that the stream of dry chemical issuing from the nozzles adjacent the end of the line, such as through nozzles 8 and 9, will discharge a greater quantity of the dry chemical in the respective streams than the streams issuing from the nozzles nearer the source of supply of the fluidized dry chemical, such as nozzles 3 and 4, which will discharge a relatively lesser amount of dry chemical and a greater amount of gas. The variation in the content of dry chemical in the different streams of dry chemical, as shown in Figure 1, is due to the inertia of the particles of dry chemical which tend to move forwardly of the pipe 10 as they are propelled by the expellant gas. Also, when a stream of fluidized dry chemical having an initial predetermined ratio of dry chemical to fluidizing and expellant gas is conveyed from a source of supply through pipe 15, as shown in Figure 2, and the direction of the stream 15a is changed such as through elbow 16 and pipe 17 to a different course, such as substantially at right angles to the initial stream, the dry chemical in stream 15a will tend to be thrown to the outside of the turn on account of its inertia, as shown diagrammatically in Figures 3 and 3A, while the gas will tend to flow on the inside of the turn due to its lesser inertia. It is thus evident that there will be an uneven distribution of dry chemical and gas in stream 17a. When the stream 17a flowing in pipe 17 is then subdivided by T-connection 18 in the manner shown in Figure 3 into two diverging streams 19a and 20a, more dry chemical will tend to flow in stream 20a than in stream 19a, and more gas will tend to flow in stream 19a than in stream 20a, as shown by Figures 3B and 3C. Consequently, there will be a change in the ratio of dry chemical and gas in the streams 21a and 22a as compared with the initial ratio of stream 15a.

It is therefore important that the finely divided dry chemical conveyed through a conduit in the pipe system should be subdivided into relatively smaller streams in such a manner that the ratio of dry chemical and expellant gas in the smaller streams is substanially the same as the ratio of dry chemical and expellant gas in the stream before subdivision.

The present invention thus provides a method of subdividing a primary stream of fluidized fire-extinguishing dry chemical having a predetermined ratio of dry chemical to fluidizing and expellant gas into a plurality of subdivided secondary streams of fluidized dry chemical having substantially the same ratio of dry chemical to fluidizing and expellant gas as in the primary stream. One method of accomplishing this, in utilizing a piping system wherein the initial course of the primary stream is changed to another direction whereby the dry chemical becomes non-uniformly distributed in the stream, is to continue the course of the stream in the same second direction until the dry chemical and expellant gas in the stream are evenly redistributed, and then equally subdividing the stream into a plurality of streams. This principle of our invention is illustrated in Figures 4 and 5, wherein a stream of fluidized dry chemical 30a is supplied to pipe 30 from a suitable source of supply. The stream then changes its direction, as for example through elbow 29, and enters pipe 31 in a different course, such as at right angles to pipe 30. Pipe 31 is connected to pipes 33 and 34 by a T-connection 32 to cause the subdivided dry chemical stream to flow through pipes 33 and 34 in opposed directions. The equally subdivided dry chemical streams 35a and 36a issue respectively from discharge nozzles 35 and 36 which are connected respectively to pipes 33 and 34.

The characteristics of the dry chemical streams flowing through the piping arrangement shown in Figure 4 are illustrated diagrammatically in Figures 5, 5D, 5E, and 5F. When the dry chemical stream 30a enters the elbow 29 and then flows through pipe 31, the dry chemical will tend to be thrown outwardly, as shown diagrammatically by stream 31a. Pipe 31 however is of such length that as the fluidized dry chemical continues to flow therein it will become redistributed in stream 31b, as shown diagrammatically in Figures 5 and 5D. The stream 31b then enters the T-connection 32 and is thereby equally divided into two opposed streams 33a and 34a flowing through pipes 33 and 34. The change of direction of the streams produced by the T-connection 32 will again tend to throw the dry chemical outwardly as shown diagrammatically by streams 33a and 34a in Figures 5, 5E and 5F. The streams 33a and 34a however have been equally subdivided to contain substantially the same ratio of dry chemical to gas as in the initial stream 30a. The streams will thus leave through nozzles 35 and 36 having the desired ratio of dry chemical and expellant gas.

A similar result can be accomplished by means of the piping arrangement shown in Figure 6, wherein a stream of dry chemical is supplied to pipe 40 from a suitable source of fluidized dry chemical. Pipe 40 is connected to pipe 41 by elbow 37. Pipe 41 is connected to pipe 42 by elbow 38. Pipe 42 is connected to pipe 43 by elbow 39. Pipe 43 is connected to pipes 45 and 46 by T-connection 44. Pipes 45 and 46 are provided respectively with nozzles 47 and 48. Pipes 41, 42 and 43 thus form a relatively short U-shaped connection for connecting pipe 40 to pipes 45 and 46. It will be also noted that pipes 45 and 46 are positioned perpendicularly to pipe 43 and that the plane passing through the axes of pipes 43, 45 and 46 is perpendicular to the axis of pipe 42. Further, it will be noted that pipe 40 is substantially parallel to pipes 45 and 46. When a stream of fluidized dry chemical 40a is supplied to pipe 40 it will pass through the elbow 37 and then through the relatively short pipes 41, 42 and 43 and will then be subdivided by T-connection 44 into subdivided streams in pipes 45 and 46, each of which is connected to discharge nozzles 47 and 48, respectively.

The characteristics of the dry chemical streams flowing through the piping shown in Figure 6 are illustrated diagrammatically in Figures 7, 7G, 7H and 7I. When the fluidized dry chemical stream 40a in pipe 40 changes its course through elbows 37, 38 and 39, the dry chemical will tend to be thrown outwardly as shown diagrammatically in Figure 7 by streams 41a, 42a and 43a. When the stream enters T-connection 44, it will be substantially equally divided into two opposed streams which then pass through pipes 45 and 46 in different directions, as shown diagrammatically in Figure 7 by streams 45a and 46a, respectively. It will be noted that stream 43a, as shown in Figure 7G, is equally subdivided by T-connection 44 with respect to the dry chemical and gas content thereof so that the two subdivided streams 45a and 46a have the same ratio of dry chemical to expellant gas, as shown in Figures 7H and 7I. The streams 45a and 46a will then pass through nozzles 47 and 48, respectively, the issuing streams 47a and 48a having the desired ratio of dry chemical and gas in substantially the same ratio as in the initial stream 40a.

Figure 8 illustrates another modified piping arrangement for subdividing a fluidized dry chemical stream in accordance with our invention. The piping consists of a supply pipe 49 connected by elbow 58 to pipe 50. Elbow 51 connects pipe 50 to pipe 52 which is connected by T-connection 53 to opositely extending pipes 54 and 55 arranged at right angles to pipe 52. Nozzles 56 and 57 are connected respectively to pipes 54 and 55. The characteristics of the dry chemical stream flowing through this piping arrangement are illustrated diagrammatically in Figures 9, 9A, 9B and 9C. The dry chemical stream 49a is supplied through pipe 49, which then changes its course through pipes 50 and 52, to produce streams 50a and 52a, respectively, which have an altered distribution of dry chemical and gas. The dry chemical and expellant gas in stream 52a is then substantially equally subdivided through pipes 54 and 55, to produce streams 54a and 55a, as diagrammatically shown in Figures 9, 9B and 9C, which issue through nozzles 56 and 57, respectively, as streams 56a and 57a, having substantially the same ratio of dry chemical and propellant gas as in the initial stream 49a.

Another modified piping arrangement for subdividing a fluidized dry chemical stream in accordance with our invention is illustrated in Figure 10. The supply pipe 60 is connected by elbow 61 to pipe 62 which is in turn connected by T-connection 65 to oppositely vertically extending pipes 64 and 66 arranged at right angles to pipe 62. Nozzles 63 and 67 are connected respectively to pipes 64 and 66. The characteristics of the dry chemical stream flowing through this piping arrangement are illustrated diagrammatically in Figures 11, 11D, 11E and 11F. The dry chemical stream 60a supplied through pipe 60 changes its course in pipe 62 as stream 62a and continues through pipe 62, as shown diagrammatically in Figure 11D. The dry chemical and expellant gas components of stream 62a are then subdivided equally in T-connection 65 into two opposed streams 64a and 66a which issue respectively as streams 63a and 67a through respective nozzles 63 and 67 having substantially the same ratio of dry chemical to expellant gas as in the initial stream 60a.

It is to be understood that the piping arrangements herein described may be varied in many ways using any suitable types of conduits, connections and nozzles and that the invention is not restricted to the specific illustrative embodiments herein described. However, it is essential to arrange the piping in such manner that at the point of subdivision at any point in the piping system the dry chemical stream should be subdivided equally.

A piping system embodying the novel features of this invention is illustrated diagrammatically in Figure 12, wherein a source of fluidized dry chemical 1 is connected to pipe 70 which in turn is connected by pipe 71 to pipes 72 and 72a by a T-connection. Pipe 71 is of such length as to permit the fluidized dry chemical stream passing therethrough to become evenly redistributed before being subdivided into two opposed streams in pipes 72 and 72a. Pipe 72 is connected by pipe 73 to pipes 75 and 75a by a suitable T-connection. The length of pipe 73 is such as to permit the fluidized dry chemical stream passing therethrough to recombine or become uniformly redistributed before being subdivided in pipes 75 and 75a. Pipe 75 is connected by pipe 76 to pipes 78 and 78a by a suitable T-connection. Pipe 76 is of such length as to permit the fluidized dry chemical stream passing therethrough to be recombined or uniformly redistributed before being subdivided in pipes 78 and 78a. Nozzles 79 and 80 are connected to pipes 78 and 78a, respectively. Pipe 75a is connected to nozzle 77. It will be apparent that the streams issuing from nozzles 79, 80 and 77 will each have substantially the same ratio of dry chemical to gas as in the initial stream supplied to pipe 70.

Pipe 72a is connected to pipe 74 which in turn is connected by a suitable T-connection to pipes 81 and 81a. Pipe 74 is of such length as will permit the fluidized dry chemical stream flowing therethrough to recombine or become uniformly redistributed before being subdivided in pipes 81 and 81a. Pipe 81 is connected by pipe 82 to pipes 84 and 84a by a suitable T-connection. Nozzles 85 and 86 are connected to pipes 84 and 84a, respectively. Pipe 82 is of such length as to permit the fluidized dry chemical stream passing therethrough to recombine before being subdivided in pipes 84 and 84a.

Pipe 81a is connected by pipe 83 to pipes 87 and 87a by a suitable T-connection. Nozzles 88 and 89 are connected to pipes 87 and 87a, respectively. Pipe 83 is of such length as to permit the fluidized dry chemical stream passing therethrough to recombine before being subdivided in pipes 87 and 87a. It will thus be apparent that the streams issuing from nozzles 85, 86, 88 and 89 each will have substantially the same ratio of dry chemical to gas as in the initial fluidized dry chemical stream supplied to pipe 70. A piping system is thus provided whereby it is possible to supply a stream of fluidized dry chemical at any point thereof which will have substantially the same ratio of dry chemical to expellant gas as a stream emitted in any other point in the system.

Instead of using straight connecting supply pipes 71, 73, 74, 76, 77, 82 and 83 of such length as to permit the fluidized dry chemical stream passing therethrough to recombine before subdividing the streams therein we may utilize the short type connections as illustrated in Figures 6, 8 and 10 to accomplish the same purpose. It is thus obvious that the types of connections illustrated in Figures 4, 6, 8 and 10 can be optionally utilized as desired depending upon the conditions existing where a fluidized dry chemical system is to be installed.

Changes and modifications may be made in the details of the invention herein described which are intended to be included within the scope of the appended claims.

We claim:

1. The method of subdividing a primary stream of fluidized fire-extinguishing dry chemical of predetermined ratio of dry chemical to fluidizing and expellant gas into a plurality of subdivided streams of fluidized dry chemical having substantially the same ratio of dry chemical to fluidizing and expellant gas as in the primary stream, which comprises changing the course of the said primary stream in a second direction whereby the fluidized dry chemical becomes non-uniformly distributed in the stream, continuing the course of said stream in the same second direction until the dry chemical in said stream is substantially uniformly redistributed, then substantially equally subdividing said stream into a plurality of streams substantially normal to said stream.

2. The method of subdividing a primary stream of fluidized fire-extinguishing dry chemical of predetermined ratio of dry chemical to fluidizing and expellant gas into a plurality of subdivided streams of fluidized dry chemical having substantially the same ratio of dry chemical to fluidizing and expellant gas as in the primary stream, said subdivided streams flowing in courses substantially parallel to the course of the said primary stream, which comprises changing the course of the said primary stream in a second direction substantially at right angles to the initial direction of the primary stream whereby the fluidized dry chemical becomes non-uniformly distributed in the stream, continuing the course of said stream in the same second direction until the dry chemical in said stream is uniformly redistributed, then substantially equally subdividing said stream into a plurality of diverging streams in a plane substantially parallel to the course of said initial stream.

3. The method of subdividing a primary stream of fluidized fire-extinguishing dry chemical of predetermined ratio of dry chemical to fluidizing and expellant gas into a plurality of subdivided streams of fluidized dry chemical having substantially the same ratio of dry chemical to fluidizing and expellant gas as in the primary stream, which comprises changing the course of the said primary stream in a second direction substantially at right angles to the initial direction of the primary stream whereby the fluidized dry chemical becomes non-uniformly distributed in the stream, continuing the course of said stream in the same second direction until the dry chemical in said stream is uniformly redistributed, then substantially equally subdividing said stream into a plurality of streams having substantially the same ratio of dry chemical to gas as in the primary stream.

4. The method of subdividing a primary stream of fluidized fire-extinguishing dry chemical of predetermined ratio of dry chemical to fluidizing and expellant gas into a plurality of subdivided streams of fluidized dry chemical having substantially the same ratio of dry chemical to fluidizing and expellant gas as in the primary stream, which comprises changing the course of said primary stream in a second direction whereby the fluidized dry chemical becomes non-uniformly distributed in the stream, then again changing the course of said stream to form a stream having the dry chemical and gas in substantially the same ratio as in the initial stream and then substantially equally subdividing said stream with respect to the dry chemical and gas content thereof into a plurality of streams substantially normal to said stream.

5. The method of subdividing a stream of non-uniformly distributed dry chemical and fluidizing gas which comprises conducting said stream in a substantially continuous straight course to produce a redistributed stream having said dry chemical and gas substantially uniformly distributed therein, then subdividing said redistributed stream into two opposed streams of substantially the same ratio of dry chemical and gas, the common axis of said opposed streams being perpendicular to the said continuous straight course.

6. The method of subdividing a stream of dry chemical and fluidizing gas which comprises conducting said stream in a primary direction, then changing the course of said stream whereby the dry chemical and fluidizing gas are non-uniformly distributed in said stream, then while said stream is in said condition subdividing said stream into two opposed streams, each stream having substantially the same gas to dry chemical ratio, the common axis of said opposed streams being substantially perpendicular to the plane determined by the axis of the said primary stream and the axis of the said changed course.

7. The method of subdividing a primary stream of dry chemical and fluidizing gas which comprises dividing the stream into two opposed streams having substantially equal gas and dry chemical ratios, the common axis of said opposed streams being perpendicular to the plane which passes through the central axis of said primary stream and having equal quantities of dry chemical and equal quantities of gas on each side of said plane.

8. The method of subdividing a stream of dry chemical and fluidizing gas which comprises conducting said stream in a primary direction, then changing the course of said stream through a substantially right-angled-L-shaped course whereby the dry chemical and fluidizing gas are non-uniformly distributed in said stream, then while said stream is in said condition subdividing said stream into two opposed streams, each stream having substantially the same gas to dry chemical ratio, the common axis of said opposed streams being substantially perpendicular to the plane determined by said right-angled-L-shaped course.

9. The method of subdividing a stream of dry chemical and fluidizing gas which comprises conducting said stream in a primary direction, then changing the course of said stream through a substantially right-angled-U-shaped course whereby the dry chemical and fluidizing gas are non-uniformly distributed in said stream, then while said stream is in said condition subdividing said stream into two opposed streams, each stream having substantially the same gas to dry chemical ratio, the common axis of said opposed streams being substantiailly perpendicular to the plane determined by said right-angled-U-shaped course.

References Cited in the file of this patent

UNITED STATES PATENTS

| | | |
|---|---|---|
| 1,677,726 | Nagel | July 17, 1928 |
| 1,707,335 | Van Brunt | Apr. 2, 1929 |
| 1,827,727 | Blizard | Oct. 20, 1931 |
| 1,871,853 | Kennedy | Aug. 16, 1932 |
| 1,875,808 | Gerquest | Sept. 6, 1932 |
| 1,882,056 | Bailey | Oct. 11, 1932 |
| 1,941,471 | Hardgrove | Jan. 2, 1934 |